Patented Feb. 16, 1937

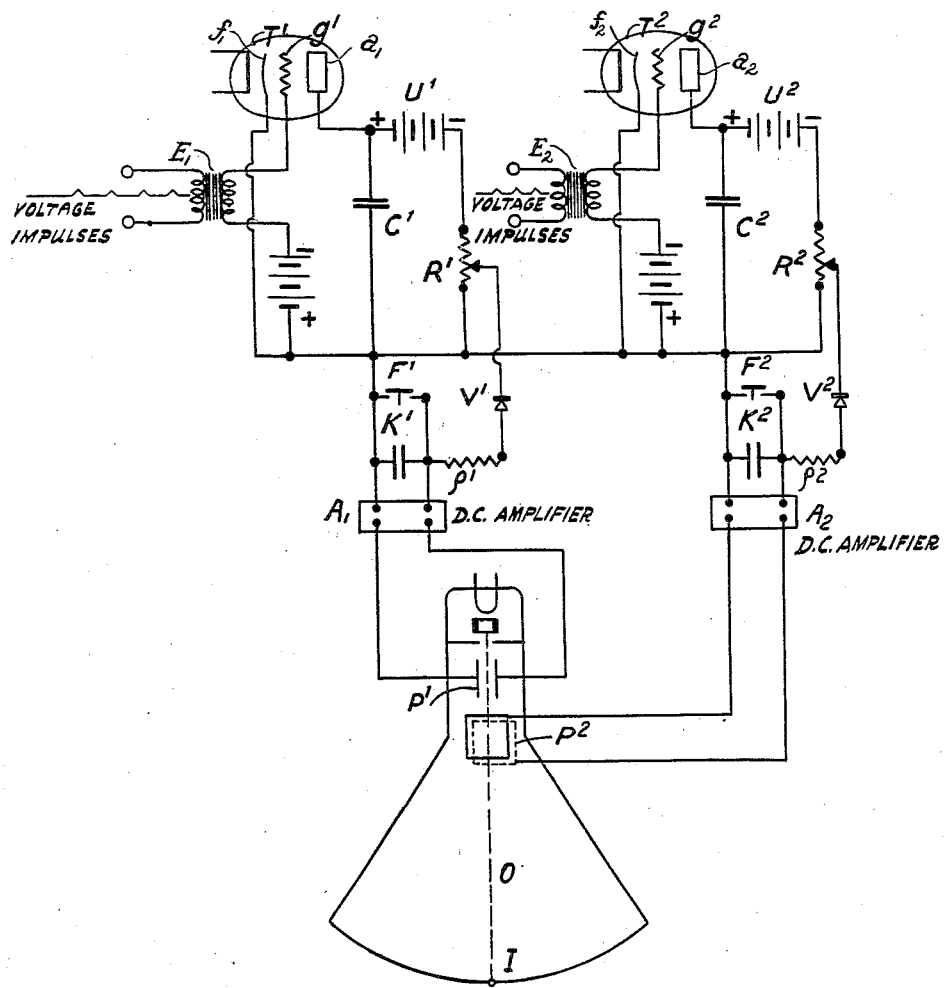

2,070,774

UNITED STATES PATENT OFFICE 2,070,774

METHOD OF RECEPTION OF ELECTRIC SIGNALING IMPULSES

René Barthelemy, Fontenay Aux Roses, France, assignor to Compagnie pour la Fabrication des Compteurs et Materiel D'Usines a Gaz, Montrouge, (Seine) France Application September 22, 1934, Serial No. 745,096
In France September 27, 1933

6 Claims. (Cl. 177—351)

It is already known to use, in telemechanics, systems known as impulse systems in which a transmitting member sends out a certain number of "brief signals or impulses" and in which a receiving device counts these signals, providing by a figure the indication which it has been desired to transmit. To this effect, each "signal" of the transmitting device corresponds, at the receiver, to the movement of an electro-magnet and an advancement, for example, of a ratchet wheel which turns through a predetermined angle. At the end of $n$ "signals", the wheel having turned through an angle $\alpha$ corresponding to the totality of the impulses, presents a figure which will mark the indication or the order transmitted.

The mechanical part of these systems is obviously of very considerable importance and it must be made in a precision manner; further, the reception is not very rapid.

The present invention provides a method of reception according to which each electric impulse releases or provokes, not the movement of an electro-magnet, but the discharge of a condenser or, more generally, puts into action a predetermined quantity of electricity. The successive quantities, independent of the amplitudes of the provoking impulses, serve for the charging of another condenser and add themselves to one another therein. It is then sufficient to read, by a simple measuring apparatus, the difference of potential at the terminals of this condenser, in order to obtain an indication proportional to the number of impulses sent out. It will thus be seen that, there being no mechanical member moved in the receiver, it is possible to receive instantaneously the indication transmitted.

The realization of this static integrator is based on the use of an ionized gas tube, a diode or better a triode, one type of which is known as a Thyratron, combined with a condenser, a resistance and appropriate sources of current. The incoming impulse, acting on the control grid of the gas tube, determines the setting up of a discharge in the interior of the tube and the amplitude of the signal has practically no effect on the discharge phenomenon, as soon as it has been set up. There is a condenser, previously charged, which provides the current and a high resistance, placed between the condenser and a source of continuous current, effects the recharging of the condenser as soon as the discharge, which is moreover very rapid, is terminated. Definitely, it is the source which provides the quantity of electricity delivered in the tube and this is the same at each discharge subject to the condenser having had time to recharge itself substantially to the potential of the source between two successive signals.

It is then sufficient to measure the total of the successive discharges from the source in order to ascertain the number of "signals" sent out. This can be obtained directly with the aid of a ballistic galvanometer or of a flux meter, but these are delicate laboratory instruments. According to the present invention, the following method is preferable.

In the path of these charges there is interposed a resistance which will cause a potential difference to be set up, which potential difference is applied through a rectifier of unilateral conductivity and a resistance having a sufficient value, to a condenser.

It can be shown that the difference of potential across the terminals of this latter element increases with the number of discharges in a manner which is substantially proportional to the number of discharges.

If this condenser cannot discharge itself rapidly, it retains its potential for a long time so that, applied directly or through the intermediary of an amplifier to a measuring apparatus, it is possible to obtain an indication remaining throughout a considerable time.

The measuring apparatus may advantageously be constituted by a cathode ray oscillograph in which the cathode beam is capable of displacement under the action of the difference of potential applied to two plates disposed on one side and on the other of the said beam. The position of the point of impact of the cathode beam on the fluorescent screen of the tube will give the translation of the signal received, if, by previous graduation, the apparatus has been graduated in numbers of impulses.

It is possible to combine two apparatus such as has just been described in order to enable two signals to be received separately and to obtain an indication which is a combination of these two signals, for example, in order to determine a point on a plane by means of its abscissa and its ordinate with respect to two axes of said plane. One of the devices receives the signals defining the abscissa of the point (in question) and the other receives the signals defining its ordinates. The same cathode ray oscillograph is used for both of the apparatus. Two plates of said oscillograph are connected to one apparatus and two other plates disposed perpendicularly with respect to the first two plates are connected to the other. The position of the point of impact of the cathode beam determines the position of the point on the plane.

The attached drawing, which illustrates this invention by way of example only, will enable the operation of the system to be more readily understood. This drawing represents diagrammatically an apparatus for carrying out the method according to the present invention as applied to the reception of two signals.

The impulses of each one of the signals act respectively on the grids $g_1$ and $g_2$ of the gas tubes $T_1$ and $T_2$ through the intermediary of transformers $E_1$ and $E_2$, and electric discharges are set up respectively between the anode $a_1$ and the cathode $F_1$ of the tube $T_1$ and between the anode $a_2$ and the cathode $F_2$ of the tube $T_2$. The condenser $C_1$ almost instantaneously loses its charge, and the resistance $R_1$ connecting $C_1$ to the source $U_1$ being sufficiently high, the potential of the anode of $T_1$ falls so low that the discharge ceases. At this moment, the condenser $C_1$ commences to recharge itself through the resistance $R_1$ and its potential will become practically equal to that of the source $U_1$, at the end of a time which will depend only on the respective values of $C_1$ and of $R_1$. This time must obviously be less than that which separates two successive impulses, in order that the following impulse may find the $C_1$—$T_1$ assembly in the same conditions as the first impulse.

The operation of the assembly $T_2$, $C_2$, $U_2$, $R_2$ is the same as that of the assembly $T_1$, $C_1$, $U_1$, $R_1$.

The measurement is effected in the following manner: A circuit comprising a capacity $K_1$, a rectifier $V_1$, preferably thermo-electronic, and a resistance $\rho_1$ is placed in parallel across a part of the resistance $R_1$. In the same manner, a circuit $K_2$, $V_2$, $\rho_2$ is connected in parallel across a part of the resistance $R_2$.

After the first impulse has brought about the discharge of the condenser $C_1$, a part of the current fed by the source $U_1$ for the charge of the said condenser $C_1$ passes through the circuit $K_1$, $V_1$, $\rho_1$ and charges the condenser $K_1$ with a quantity of electricity $q_1$ which cannot leak away in the opposite direction when the charging current falls off since the rectifier $V_1$ only permits the passage of the current in a single direction. There is thus set up between the plates of the condenser $K_1$ a difference of potential $u_1$, given by the following equation in which $K_1$ designates the capacity of the condenser $K_1$ $$u_1 = \frac{q_1}{K_1}$$

The following impulse sets up a charge $q_1^1$ slightly less than $q_1$, because the condenser $K_1$ acts as a source of voltage $u_1$ connected in opposition in the circuit $K_1$, $V_1$, $\rho_1$ but, in practice, if the resistance $\rho_1$ be sufficiently high, the charge $q_1^1$ can be considered as being equal to $q_1$. The potential then becomes $2u_1$, and so on, that is to say $nu_1$ after $n$ impulses. There is, however, no absolute necessity that there shall exist an exact proportionality.

It will be well understood that the value of the capacity $K_1$ will be made sufficiently great in order that the leakage currents shall not substantially change the value of the charge during the time of reading. Experiments have shown that this value can be considered as being constant during periods of time of the order of one minute.

In the same way, the condenser $K_2$ is charged, at the end of the reception by $T_2$ of a signal of $n$ impulses with a quantity of electricity $nq_2$, and its potential becomes $nu_2$, $q_2$ and $u_2$ designating respectively the quantity of electricity received by the condenser $K_2$ at each impulse and the increase of voltage of the condenser $K_2$ corresponding to this quantity of electricity.

The condensers $K_1$ and $K_2$ are connected directly, or through the intermediary of amplifier devices $A_1$ and $A_2$, to means capable of evaluating their potentials, for example, to the control plates $P_1$ and $P_2$ of a cathode ray oscillograph O. The position of the point of impact I of the cathode beam on the screen is determined by the value of the potentials applied to the plates $P_1$ and $P_2$, and consequently by the number of impulses comprising each one of the signals.

Keys $F_1$ and $F_2$ operated manually enable the condensers $K_1$ and $K_2$ to be short-circuited in order to return the apparatus to zero after the reading of the indication furnished by the signals, and in order to receive the following signals.

The apparatus can be used for the reception of a single signal, the translation of which is read according to the rectilineal displacement of the point I on the screen of the tube.

What I claim is:—

1. In a system for receiving signals consisting of successive electrical impulses, the combination comprising a gaseous electrical discharge tube comprising at least an anode, a cathode and a control electrode, means for applying between the cathode and the control electrode a voltage at each impulse which renders conductive the space between the anode and the cathode upon each impulse, a condenser connected between the anode and the cathode and discharged upon each impulse, a first circuit comprising a source of electrical energy and a resistance for recharging said condenser, a second circuit shunting a part of said resistance and comprising in series a condenser the charge of which increases at each impulse and a unilaterally conductive device, and means for measuring the voltage of the condenser in the second circuit and discharging the condenser of the second circuit a negligible quantity.

2. In a system for receiving signals consisting of successive electrical impulses, the combination comprising a gaseous electrical discharge tube comprising at least an anode, a cathode and a control electrode, means for applying between the cathode and the control electrode a voltage at each impulse which renders conductive the space between the anode and the cathode upon each impulse, a condenser connected between the anode and the cathode and discharged upon each impulse, a first circuit comprising a source of electrical energy and a resistance for recharging said condenser, a second circuit shunting an adjustable portion of the said resistance and comprising in series a condenser the charge of which increases at each impulse and a unilaterally conductive device, means for measuring the voltage of the condenser in the second circuit, said means discharging the condenser of the second circuit a negligible amount, and a switch operable at will for discharging the condenser in the second circuit after the reception of a signal.

3. In a system for receiving two signals each consisting of successive electrical impulses, the combination comprising two channels for the respective signals, each channel comprising in combination a gaseous electrical discharge tube comprising at least an anode, a cathode and a control electrode with means for applying between said cathode and control electrode a voltage at each impulse which renders conductive the spaces between the anode and cathode during each impulse, a condenser connected between the anode and the cathode and discharged upon each impulse, a first circuit comprising a source of electrical energy and a resistance for recharging said condenser, and a second circuit shunting an adjustable portion of the said resistance and comprising in series a condenser the charge of which increases at each impulse and a unilaterally conductive device, and a single cathode beam oscillograph having two pairs of plates for moving the said cathode beam in two different directions, one pair of plates being controlled by the voltage of the condenser in the second circuit of a channel, the other pair of plates being controlled by the voltage of the condenser in the second circuit of the other channel.

4. In a system for receiving two signals each consisting of successive electrical impulses, the combination comprising two channels for the respective signals, each channel comprising in combination a gaseous electrical discharge tube comprising at least an anode, a cathode and a control electrode with means for applying between said cathode and control electrode a voltage at each impulse which renders conductive the spaces between the anode and cathode during each impulse, a condenser connected between the anode and the cathode and discharged upon each impulse, a first circuit comprising a source of electrical energy and a resistance for recharging said condenser, a second circuit shunting an adjustable portion of the said resistance and comprising in series a condenser the charge of which increases at each impulse and a unilaterally conductive device, and a switch operable at will for discharging the condenser in the second circuit after the reception of a signal, and a single cathode beam oscillograph having two pairs of plates for moving the said cathode beam in two different directions, one pair of plates being controlled by the voltage of the condenser in the second circuit of a channel, the other pair of plates being controlled by the voltage of the condenser in the second circuit of the other channel.

5. In a system for receiving signals consisting of successive electrical impulses, the combination comprising a gaseous electrical discharge tube comprising at least an anode, a cathode and a control electrode, means for applying between the cathode and the control electrode a voltage at each impulse which renders conductive the space between the anode and the cathode upon each impulse, a condenser connected between the anode and the cathode and discharged upon each impulse, a first circuit comprising a source of electrical energy and a resistance for recharging said condenser, a second circuit shunting an adjustable portion of the said resistance and comprising in series a condenser the charge of which increases at each impulse. a resistance and a unilaterally conductive device, and means for measuring the voltage of the condenser in the second circuit, said means discharging the condenser of the second circuit of negligible amount.

6. In a system for receiving two signals each consisting of successive electrical impulses, the combination comprising two channels for the respective signals, each channel comprising in combination a gaseous electrical discharge tube comprising at least an anode, a cathode and a control electrode with means for applying between said cathode and control electrode a voltage at each impulse which renders conductive the spaces between the anode and cathode during each impulse, a condenser connected between the anode and the cathode and discharged upon each impulse, a first circuit comprising a source of electrical energy and a resistance for recharging said condenser, a second circuit shunting an adjustable portion of the said resistance and comprising in series a condenser the charge of which increases at each impulse, a resistance and a unilaterally conductive device, and a switch operable at will for discharging the condenser in the second circuit after the reception of a signal, and a single cathode beam oscillograph having two pairs of plates for moving the said cathode beam in two different directions, one pair of plates being controlled by the voltage of the condenser in the second circuit of a channel, the other pair of plates being controlled by the voltage of the condenser in the second circuit of the other channel.

RENÉ BARTHELEMY.